(12) United States Patent
Watanabe et al.

(10) Patent No.: US 6,661,461 B1
(45) Date of Patent: *Dec. 9, 2003

(54) VIDEO CAMERA WITH SEPARATE ON/OFF SWITCH FOR LIGHT INCORPORATED THEREIN

(75) Inventors: Hajime Watanabe, Tokyo (JP); Masashige Kimura, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1251 days.

(21) Appl. No.: 08/770,039

(22) Filed: Dec. 19, 1996

(30) Foreign Application Priority Data

Dec. 25, 1995 (JP) .......................... P7-351532

(51) Int. Cl.7 .............................. H04N 5/225
(52) U.S. Cl. ...................................... 348/370
(58) Field of Search ................. 348/370, 372, 348/371; 200/43.01; 396/302; 362/3, 4

(56) References Cited

U.S. PATENT DOCUMENTS

| | | | | |
|---|---|---|---|---|
| 4,782,355 A | * | 11/1988 | Sakai et al. | 348/372 |
| 4,881,128 A | * | 11/1989 | Yamada | 348/371 |
| 5,073,823 A | * | 12/1991 | Yamada et al. | 348/372 |
| 5,130,741 A | * | 7/1992 | Nishigaki et al. | 348/372 |
| 5,299,012 A | * | 3/1994 | Tsuruta et al. | 348/372 |
| 5,309,195 A | * | 5/1994 | Goo et al. | 396/302 |

* cited by examiner

*Primary Examiner*—Wendy R. Garber
*Assistant Examiner*—Jacqueline Wilson
(74) *Attorney, Agent, or Firm*—Fommer Lawrence & Haug LLP; William S. Frommer; Glenn F. Savit

(57) ABSTRACT

A light-incorporated video camera incorporating a video light integrally in a video camera, includes: a video light input switch for instructing turn-on of the video light; and a timer; wherein the video light turned on by instruction from the video light input switch is automatically turned off after the elapse of a time set on the timer. If a switch key of the video camera is operated before the time set on the timer expires, the timer is initialized to continue the turn-on state of the video light. In this video camera, preferably, the switch key is a record/stop switch key of the video camera, the video light is a tungsten halogen lamp, and the timer is a five-minute timer.

14 Claims, 2 Drawing Sheets

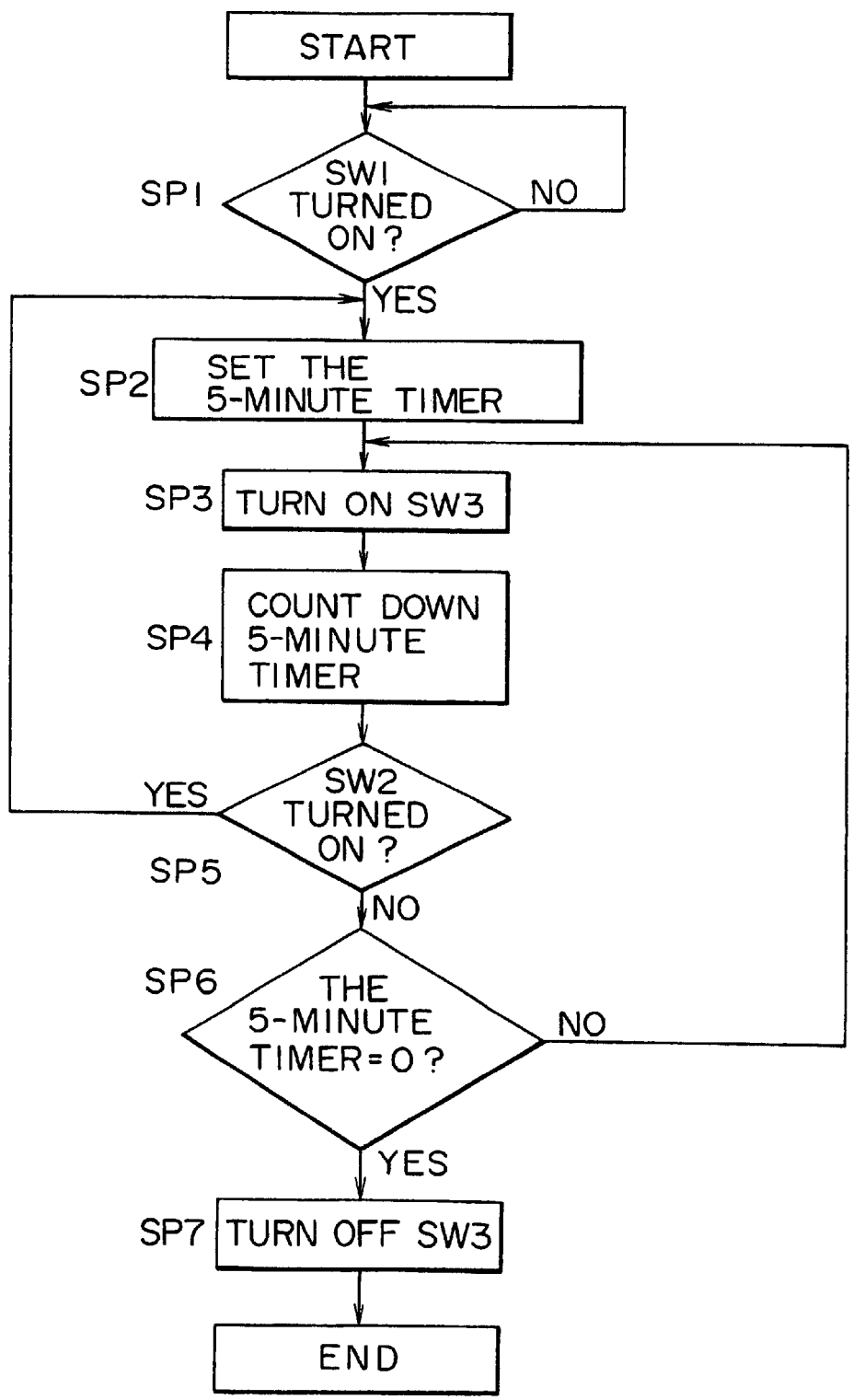

VIDEO CAMERA WITH SEPARATE ON/OFF SWITCH FOR LIGHT INCORPORATED THEREIN

BACKGROUND OF THE INVENTION

The present invention relates to a light-incorporated video camera wherein a video light for lighting is incorporated integrally in a compact video camera.

In conventional compact video cameras, a separate video light needs to be attached to the camera main for image taking in dark conditions.

The video light generally has a tungsten halogen lamp and a battery in a case body attached with a mounting arm by means of which the video light is mounted on the video camera main.

With a video camera having a separate video light, the video light must be attached and detached every time the video camera is used. Also, it is inconvenient to carry about the video camera of this type. Therefore, various designs have been proposed in an attempt to solve these problems. These designs, however, involve another problem that follows.

It is required for the video light input switch to have an operator-friendly constitution so that the switch can be turned on/off as easily as possible to allow the operator to turn on the video light as soon as dark conditions are encountered.

However, this easy turn-on/off constitution makes it possible, during transportation of the video camera in a carrying bag for example, to inadvertently turn on the video light because something in the carrying bag presses the video light input switch on.

If the video light input switch is thus turned on inadvertently, the video light is turned on in the carrying bag and kept on long in vain, thereby consuming the service lives of the video light lamp and battery more than expected.

SUMMARY OF THE INVENTION

It is therefore an object of the present invention to provide a light-incorporated video camera wherein the video light is automatically turned off after the elapse of a predetermined time set by a timer to prevent the vain consumption of service lives of the video light lamp and battery from occurring.

To achieve the above object, according to a first aspect of the present invention, there is provided a light-incorporated video camera incorporating a video light integrally in a video camera, including: a video light input switch for instructing turn-on of the video light; and a timer; wherein the video light turned on by instruction from the video light input switch is automatically turned off after the elapse of a time set on the timer.

The above video camera preferably includes an illuminometer; wherein the video light is turned on only when it is determined that lighting is necessary, based on illuminance of an object measured by the illuminometer.

In the above video camera, if a switch key of the video camera is operated before the time set on the timer expires, the timer may be initialized to continue the turn-on state of the video light. The switch key may be a record/stop switch key of the video camera. The video light may be a tungsten halogen lamp and the timer may be a five-minute timer.

According to a second aspect of the present invention, there is provided a light-incorporated video camera incorporating a video light integrally in a video camera, including: a video light input switch for instructing turn-on of the video light; a video light control switch connected at both ends between the video light and the video light input switch; a timer; and a central processing unit for controlling the video light control switch based on input information coming from the video light input switch and information coming from the timer, wherein the central processing unit starts the timer when turn-on of the video light is instructed from the video light input switch, turns on the video light control switch to turn on the video light and, when a time set on the timer expires, turns off the video light control switch to turn off the video light.

The above video camera preferably includes an illuminometer; wherein the central processing unit starts the timer when turn-on of the video light is instructed from the video light input switch and it is determined that lighting is necessary based on illuminance of an object measured by the illuminometer and turns on the video light control switch to turn on the video light.

The above central processing unit may initialize the timer when a switch key of the video camera is operated before the time set on the timer expires to continue the on-state of the video light. Moreover, in the above video camera, the switch key may be a record/stop switch key of the video camera. The video light may be a tungsten halogen lamp and the timer may be a five-minute timer. The central processing unit may control a power supply block, a key block, and a display block of the video camera.

As described above, the light-incorporated video camera of the present invention is so configured as to eliminate the inconvenience of attaching and detaching a video light every time image taking is performed and to automatically turn off the incorporated video light after the elapse of a time set on the timer, and consequently, if the record/stop switch key is pressed by something in a carrying bag or the like to turn on the video light, the same is turned off automatically after the preset time, thereby preventing the vain consumption of service lives of the lamp and the battery from occurring.

Accordingly, the present invention makes it possible for the video light not to continuously be kept on unnecessarily, resulting in longer service lives of the video light and the battery.

BRIEF DESCRIPTION OF THE DRAWINGS

The above and other objects, features and advantages of the present invention will become more apparent from the accompanying drawings, in which:

FIG. 2 is a flowchart illustrating operations in the block diagram of FIG. 1.

DETAILED DESCRIPTION OF PREFERRED EMBODIMENT

Figure 1:
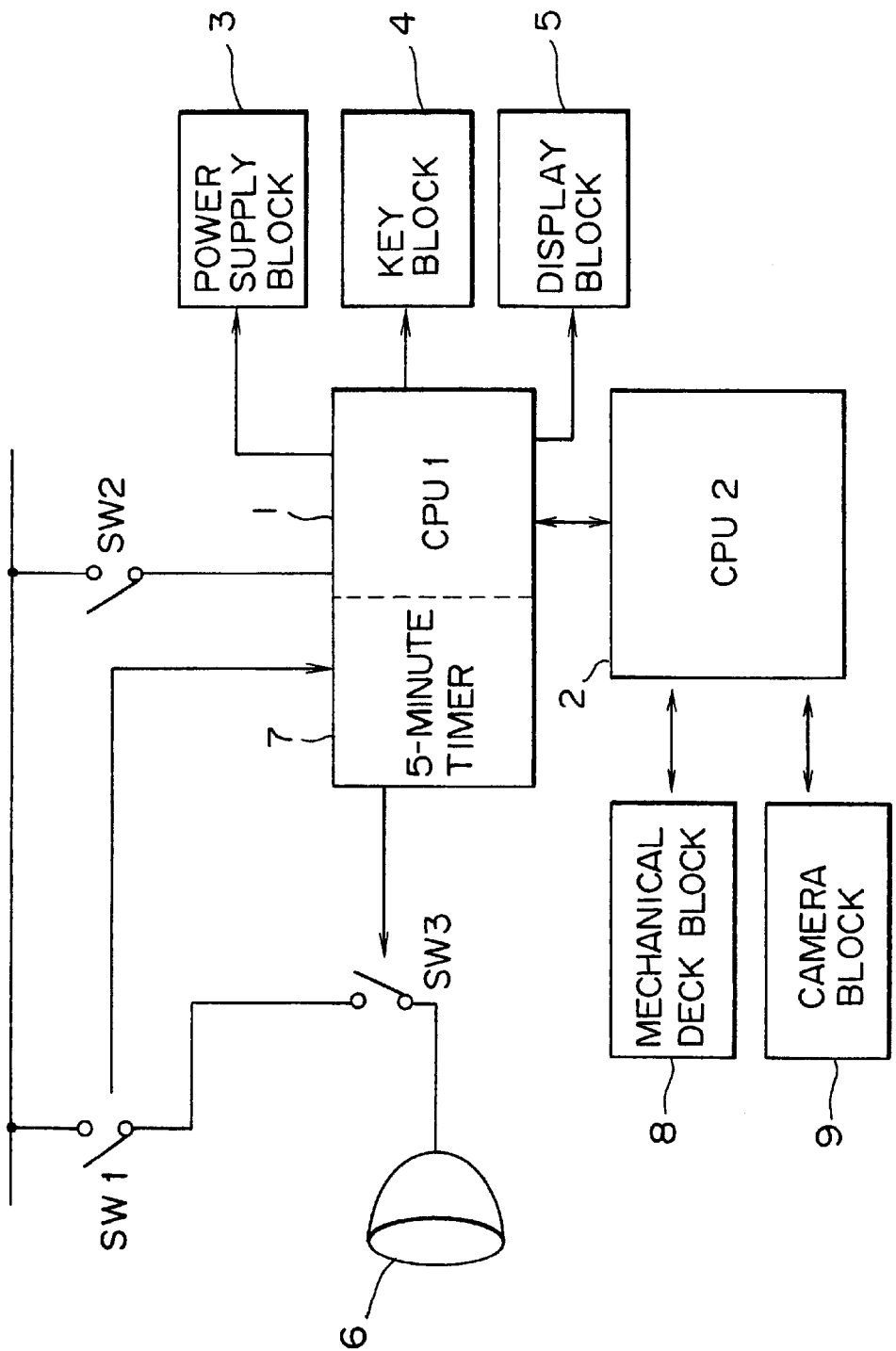
FIG. 1 is a block diagram showing an embodiment of a light-incorporated video camera according to the present invention.

Hereinafter, a preferred embodiment of the present invention will be described in detail with reference to the accompanying drawings.

Referring to FIG. 1, a record/stop switch SW2 is a main switch of a video camera to be operated in image taking. This switch is turned on/off by a tactile switch key arranged on the body of the video camera.

The on/off information of the record/stop switch SW2 is entered in a CPU (Central Processing Unit) 1.

Based on the on/off information, the CPU1 controls a power supply block 3 that supplies power to the video camera, a key block 4 containing the video camera operator switches, and a display block 5 that displays information associated with video camera operations.

A video light 6 incorporated in the video camera and made of a tungsten halogen lamp or the like is connected to the power supply block 3 via a video light control switch SW3 and a video light input switch SW1.

The video light input switch SW1 is operated by a switch key arranged on the video camera, a switch-on signal coming from the SW1 being entered in the CPU1.

A five-minute timer 7 is used to set a duration in which the video light 1 is on to five minutes. When the video light input switch SW1 is turned on, this information triggers the CPU1 to start the five-minute timer 7.

In this embodiment, a tungsten halogen lamp is used for the video light 6. Because five minutes are appropriate for the tungsten halogen lamp to keep on, the five-minute timer 7 is used. It will be apparent that any time other than five minutes may also be preset as required for the duration in which the video light is on.

A CPU2 sends information based on the information coming from the CPU1 to a mechanical deck block 8, which is a video camera reproducing section, and a camera block 9, which is a video camera recording section. Also, the CPU2 sends information coming from the mechanical deck block 8 and the camera block 9 to the CPU1.

The following describes the operations of the above-mentioned circuit.

When the video light input switch SW1 is turned on, the CPU1 uses this turn-on information as a trigger to set the five-minute timer 7 the initial value (five minutes in this case). Upon starting of the five-minute timer 7, the video light control switch SW3 is turned on to turn on the video light 6.

When the five-minute timer 7 expires, the CPU1 turns off the video light control switch SW3 to turn off the video light 6. If the key of the record/stop switch SW2 is pressed before the timer expiration, the CPU1 triggers the five-minute timer 7 to restart the same from that point of time. Therefore, the on state of the video light 6 continues.

Then, when the five-minute timer expires, the CPU1 turns off the video light control switch SW3 to turn off the video light 6. When the record/stop switch SW2 is pressed before the timer expiration, the CPU1 retriggers the five-minute timer 7 to start the same, continuing the on-state of the video light 6.

Namely, if the video light input switch SW1 is turned on and the video light 6 is turned on, the same is automatically turned off after the elapse of the preset five minutes (for example in this case). If the record/stop switch SW2 is pressed before the timer expiration, the on-state of the video light 6 is extended by another five minutes. This prevents automatic turn-off of the video light during image taking.

The following describes the operations of the above-mentioned circuit in more detail with reference to the flowchart of FIG. 2.

Turning on the video light input switch SW1 in step SP1 causes the CPU1 to initializes the five-minute timer 7 by using the information of the video light input switch SW1 as a trigger in step SP2. At the same time, the CPU1 turns on the video light control switch SW3 in step SP3, upon which the video light is turned on.

In step SP4, the five-minute timer 7 starts counting. In step SP5, the CPU1 determines whether the record/stop switch SW2 is on or not. If the record/stop switch SW2 is found not on, the process goes to step SP6.

If, in step SP6, the five-minute timer 7 reaches zero, or expires, the CPU1 turns off the video light control switch SW3 to turn off the video light 6.

If, in step SP5, the record/stop switch SW2 is found on, the process goes back to step SP2, in which the CPU1 retriggers the five-minute timer to initialize the same.

If the five-minute timer 7 does not expire in step SP6, the process goes back to step SP3.

Thus, every time the record/stop switch SW2 is turned on, the five-minute timer 7 is extended by another five minutes.

According to this embodiment, the video light 6 is incorporated integrally in the video camera, and thereby it is possible to eliminate the inconvenience of attaching and detaching a video light on the camera main every time image taking is performed. Also, in this embodiment, the video light 6 is adapted to automatically turn off upon passing of a time preset on the five-minute timer 5, and thereby if the video light input switch SW1 is turned on inadvertently by something when the video camera is stored in a carrying bag or the like, the SW1 is automatically turned off upon expiration of the five-minute timer 7, thereby preventing the vain consumption of service lives of the battery and lamp from occurring.

Operating the record/stop switch SW2 for image taking extends the five-minute timer 7 by another duration of time in which the video light 6 is on, thereby eliminating the inconvenience of turning off of the video light 6 during image taking.

An operation to clear the five-minute timer 7 can be made by use of the record/stop switch SW2 of the video camera. Therefore, there is no need for providing another switch for the purpose. Since the record/stop switch is on during image taking, the five-minute timer 7 is always cleared to eliminate an error of turning off the light during image taking.

The circuit used in this embodiment, which is composed of the CPU 1 of the ordinary video camera only added with the five-minute timer, can be manufactured at a low cost.

In this embodiment, the five-minute timer 7 is set only by the turn-on information of the video light input switch SW1. It will be apparent that information of an illuminometer disposed on the camera block 9 is sent from the CPU2 to the CPU1 to turn on the video light control switch SW3 only when lighting is required.

With this constitution, once the video light input switch SW1 is turned on at beginning of image taking, the CPU2 determines the illuminance of an object being taken and, if the CPU2 determines that the object needs lighting, the operations of step SP2 and subsequent steps are performed to the same effect.

While the preferred embodiment of the present invention has been described using specific terms, such description is for illustrative purposes only, and it is to be understood that changes and variations may be made without departing from the spirit or scope of the appended claims.

What is claimed is:

1. A light-incorporated video camera incorporating a video light integrally in a video camera, comprising:
   a first switch for individually instructing a second switch to turn-on said video light so as to enable a user to separately turn-on said video light;
   a timer;
   an illuminometer; and
   a central processing unit (CPU) for controlling said second switch based on input information from said first switch, information from said timer and information from said illuminometer;

wherein said CPU starts said timer and also turns on said second switch to turn on said video light when turn-on of said video light is instructed from said first switch and it is determined that lighting is necessary based on illuminance of an object measured by said illuminometer, and, when a time set on said timer expires, said CPU turns off said second switch to turn off said video light; and said video light is maintained in a turned-on state if said CPU determines that a record/stop switch of said video camera is on.

2. The light-incorporated video camera according to claim 1, wherein said central processing unit initializes said timer when a switch key of said video camera is operated before the time set on said timer expires to continue the on-state of said video light.

3. The light-incorporated video camera according to claim 2, wherein said switch key is a record/stop switch key of said video camera.

4. The light-incorporated video camera according to claim 1, wherein said video light is a tungsten halogen lamp and said timer is a five-minute timer.

5. The light-incorporated video camera according to claim 2, wherein said video light is a tungsten halogen lamp and said timer is a five-minute timer.

6. The light-incorporated video camera according to claim 3, wherein said video light is a tungsten halogen lamp and said timer is a five-minute timer.

7. The light-incorporated video camera according to claim 1, wherein said central processing unit controls a power supply block, a key block, and a display block of said video camera.

8. The light-incorporated video camera according to claim 2, wherein said central processing unit controls a power supply block, a key block, and a display block of said video camera.

9. The light-incorporated video camera according to claim 3, wherein said central processing unit controls a power supply block, a key block, and a display block of said video camera.

10. The light-incorporated video camera according to claim 4, wherein said central processing unit controls a power supply block, a key block, and a display block of said video camera.

11. The light-incorporated video camera according to claim 5, wherein said central processing unit controls a power supply block, a key block, and a display block of said video camera.

12. The light-incorporated video camera according to claim 6, wherein said central processing unit controls a power supply block, a key block, and a display block of said video camera.

13. The light incorporated video camera according to claim 1, wherein said video light is maintained in said turned-on state by means of said CPU initializing said timer when it is determined that said record/stop switch is on, thereby preventing said timer from expiring while said record/stop switch is on.

14. A light incorporated video camera incorporating a video light integrally in a video camera, comprising:

a first switch for individually instructing a second switch to turn on said video light so as to enable a user to separately turn on said video light;

a timer; and a central processing unit (CPU) for controlling said second switch based on input information from said first switch and information from said timer;

wherein said CPU starts said timer and also turns on said second switch to turn on said video light when turn-on of said video light is instructed from said first switch, and, when a time set on said timer expires, said CPU turns off said second switch to turn off said video light; and said video light is maintained in a turned-on state if said CPU determines that a record/stop switch of said video camera is on, by means of said CPU initializing said timer when it is determined that said record/stop switch is on, thereby preventing said timer from expiring.

* * * * *